Figure 4:
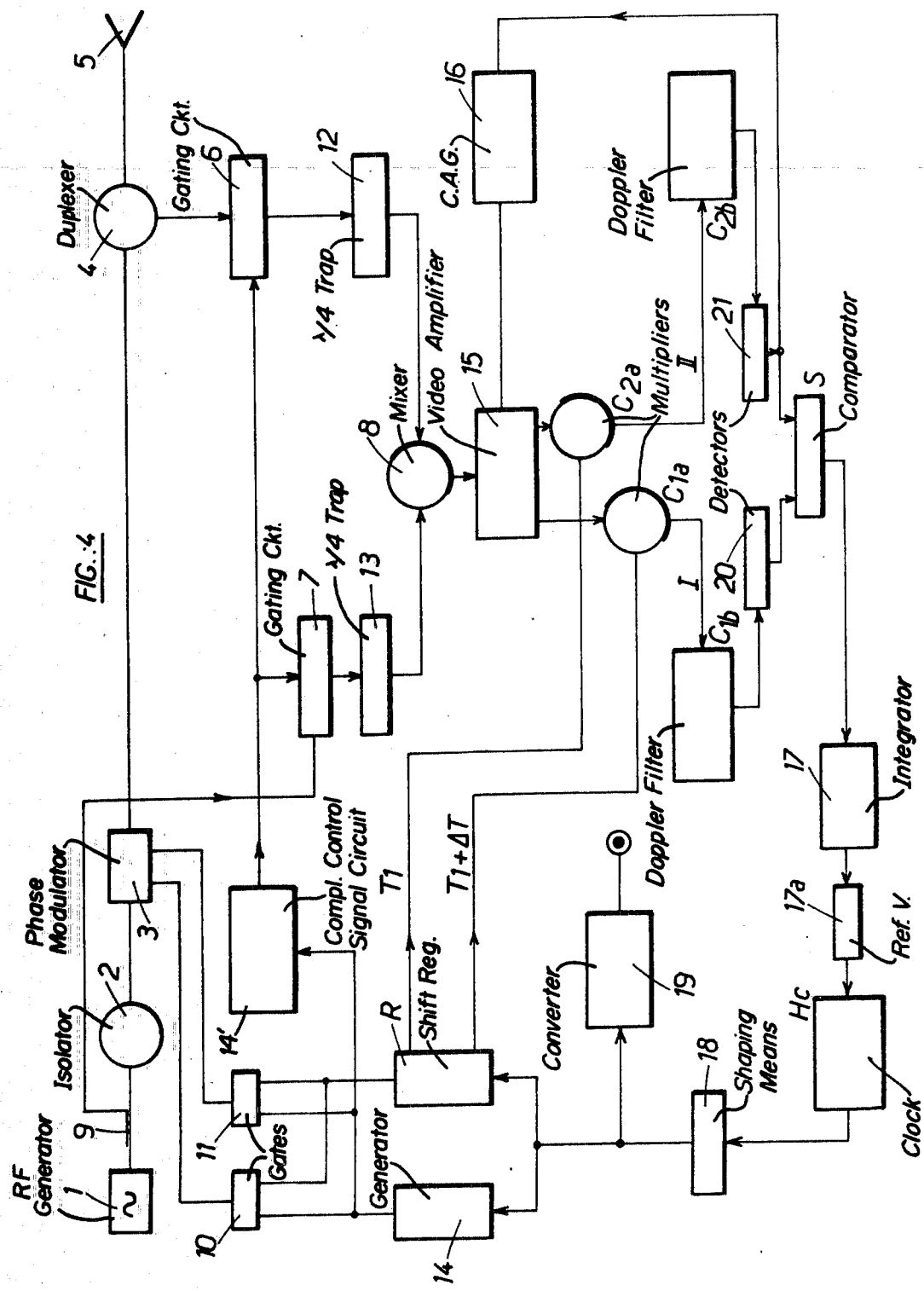

United States Patent [19]

Fournier et al.

[11] 4,014,021
[45] Mar. 22, 1977

[54] RADAR FOR SHORT RANGE MEASUREMENTS

[75] Inventors: Jacques Fournier, Chatillon sur Bagneux; Michel Nicolas, Paris, both of France

[73] Assignee: Societe Nationale d'Etude et de Construction de Moteurs d'Aviation, Paris, France

[22] Filed: Sept. 25, 1975

[21] Appl. No.: 616,680

[30] Foreign Application Priority Data

Sept. 27, 1974 France .............................. 74.33247

[52] U.S. Cl. .................................. 343/14; 343/7.5; 343/12 MD; 343/17.5
[51] Int. Cl.² .......................................... G01S 9/23
[58] Field of Search ....... 343/7 A, 7.5, 7.7, 12 MD, 343/14, 17.2 R, 17.5

[56] References Cited

UNITED STATES PATENTS

| | | | |
|---|---|---|---|
| 3,706,989 | 12/1972 | Taylor, Jr. | 343/7.5 |
| 3,774,206 | 11/1973 | Rauch | 343/7 A |
| 3,882,493 | 5/1975 | Bolger | 343/7.7 |
| 3,882,494 | 4/1975 | Bolger | 343/7.7 |

*Primary Examiner*—Richard A. Farley
*Assistant Examiner*—S. C. Buczinski
*Attorney, Agent, or Firm*—Watson, Cole, Grindle & Watson

[57] ABSTRACT

In a radar installation for measuring distances by transmitting and receiving signal modulated by sequences of pseudo-random bits, generation both of the sequence of pseudo-random bits and of corresponding sequences with which the received radar signal is correlated, is controlled by a variable frequency clock. The frequency of the clock is varied to maximize the peak of the correlation function and the resulting frequency used to indicate the radar-target distance.

5 Claims, 5 Drawing Figures

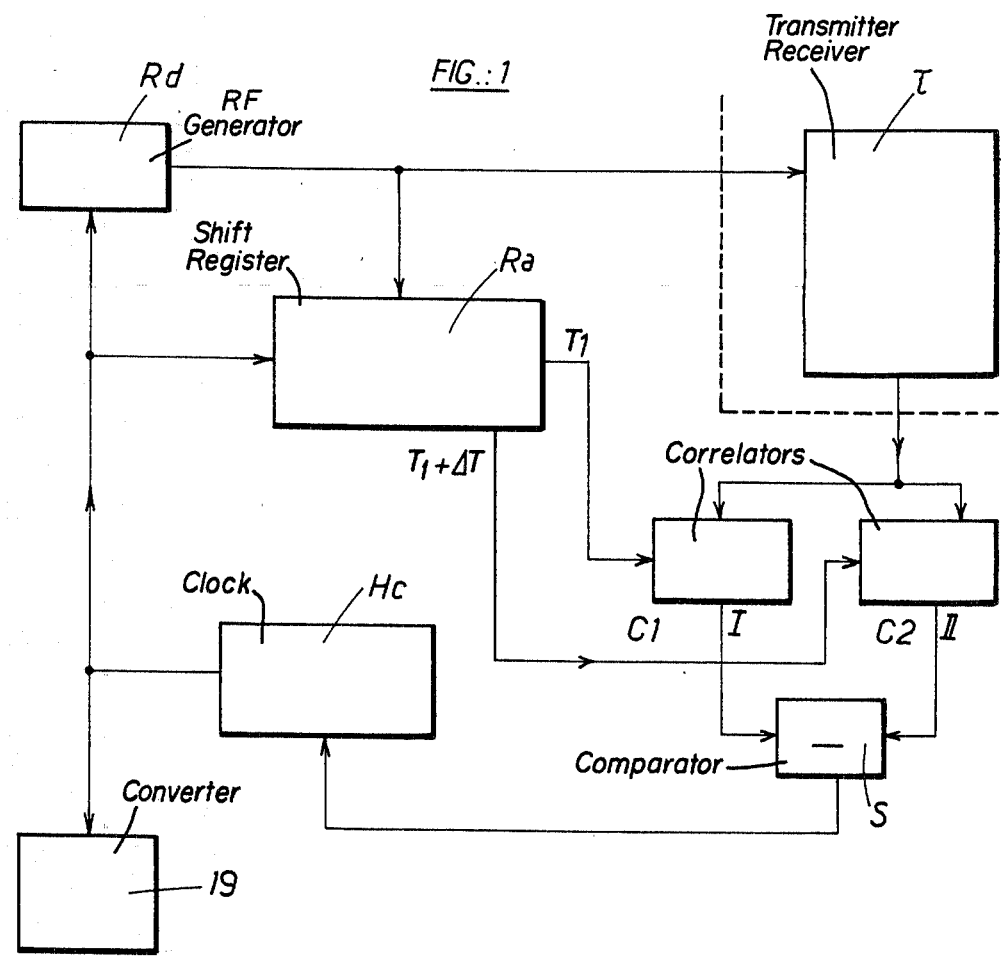

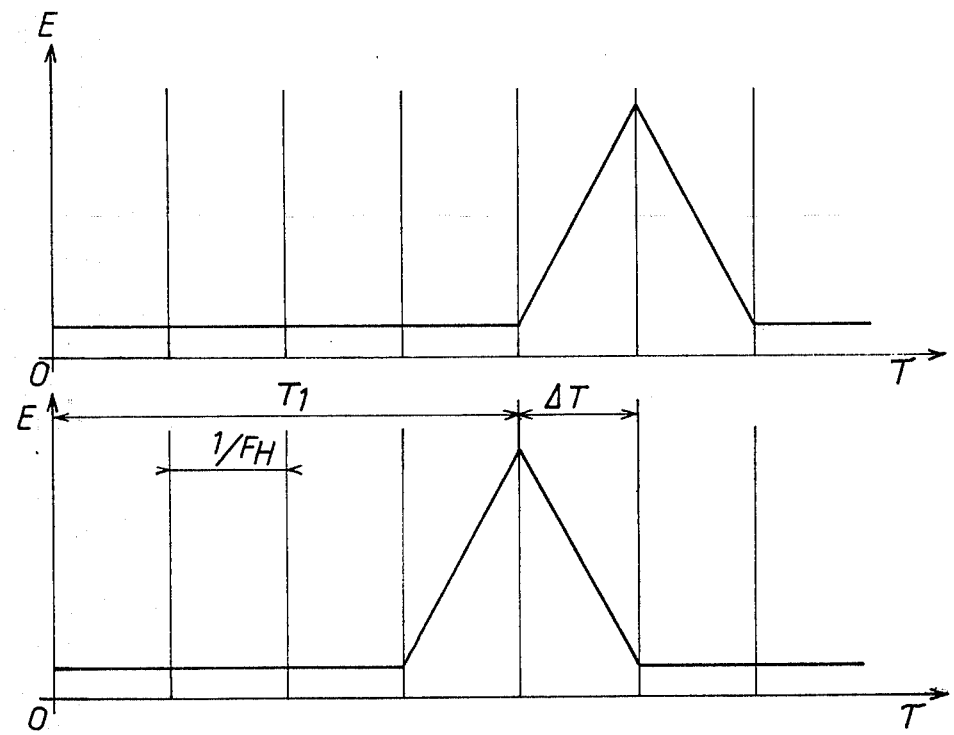
FIG.:2
FIG.:3
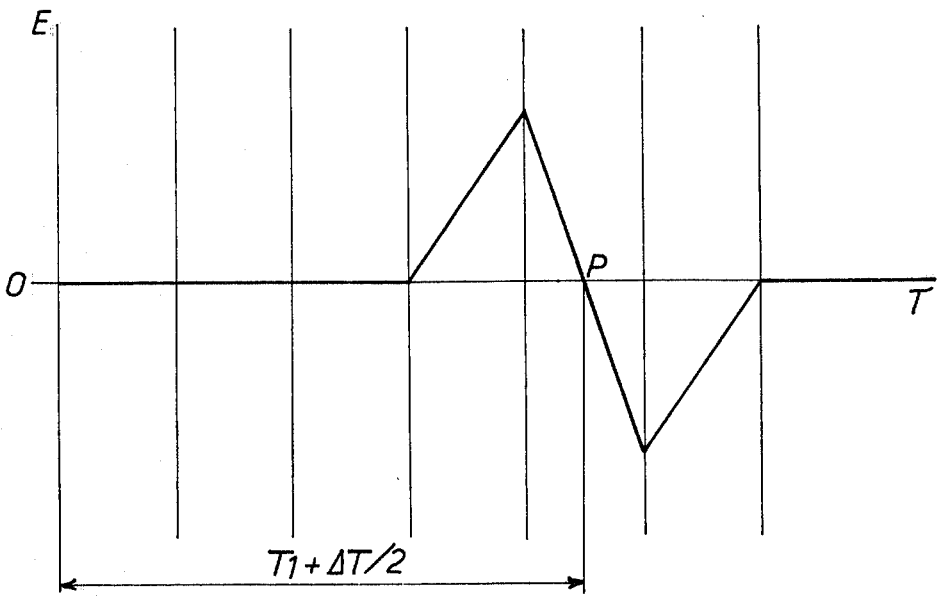

RADAR FOR SHORT RANGE MEASUREMENTS

This invention relates to a radar installation, and more particularly to a telemetry radar installation for measuring short distances, also called a proximity radar.

The applications of this type of radar installation, are such that it is desirable for them to give good accuracy which is not easy to arrange.

An object of the invention is to obtain this desired accuracy. For example, it may be desired to mount a proximity radar on a target vehicle to enable the distance of closest passage of an intercepting vehicle to be measured. It is a further object of the invention to provide a simple system for this purpose at a low cost.

According to the invention, there is provided a radar installation for measuring distances by transmitting and receiving signals modulated by sequences of pseudo-random bits, the receiving part of the installation comprising a variable frequency clock and two correlators for correlating the signal received from the target with two signals of differing time delay derived from respective outputs of a shift register driven by said clock, the frequency of which is controlled by a signal from a subtraction circuit connected to the outputs of the two correlators, and the transmitting part of the installation comprising a shift register connected in a closed loop, driven by said clock and used for modulating the transmitted radar signals, the frequency of the said clock indicating the radar-target distance.

The radar-target distance may be of the order of several tens of meters.

It will be noted that the use of a double correlation, with two slightly different delay values, enables an error voltage to be produced for controlling the frequency of the clock.

It should be noted that when the invention is applied to airborne targets, the target vehicle can operate at very low altitudes, so that the ground return signal can be much stronger than the required signal reflected from the interception vehicle.

Using a correlation system, which responds to a predetermined zone of distances, the required signal for the measurement of distance can be distinguished. The proximity radar can be arranged to be synchronised to the nearest echo subject to a Doppler shift if the corresponding target distance is less than 30 meters. There are no false indications, as it is possible to use other systems to produce pulses or frequency modulation corresponding to multiples of the normal echo distance.

Moreover, particular precautions are taken for limiting the durations of the transmitted and received signals in such a way as to receive only echos, coming from the required target zone.

The invention will be better explained and understood from the following description of an embodiment of the invention, given by way of example, with reference to the attached drawings, in which:

FIG. 1 is a block diagram of a proximity radar in accordance with the invention, FIGS. 2 and 3 show the correlation functions of the two correlators of the radar shown in FIG. 1, FIG. 4 is a more detailed schematic diagram of the proximity radar shown in FIG. 1, and FIG. 5 is a timing diagram showing the transmitting and receiving time intervals.

Before describing the embodiment of the invention, the principle of correlation in radar range measurement will be briefly described.

A source transmits a signal S $(t)$ via an aerial towards a target. The reflected signal is "correlated" with the transmitted signal delayed by a time interval $\tau_0$, i.e. that the correlation carries out the operation:

$$\int_{t-T}^{t} S(t-\tau_0) \cdot S(t-\tau) \, dt$$

When the delay of the signal reflected by the obstacle has the value $\tau_0$, the correlator provides a maximum voltage. Knowledge of $\tau_0$ therefore gives knowledge of $\tau$, and hence of the distance of the obstacle. The precision obtained depends on the width of the correlation function R $(\delta)$. This width is of the order of the inverse of the bandwidth of the emitted signal.

The correlator is formed from a multiplier followed by an integrator filter. When the relative speed of the obstacle varies with time, the integrator filter which can be of the band-pass type is centered on the average Doppler frequency. The bandwidth must not exceed the dispersion due to this Doppler shift, which permits the maximum signal-to-noise ratio to be obtained at output.

Correlation radar range measurement systems generally use a transmission signal of the random type, which avoids responses to non-existent echos which correspond to the periodicity of the transmitted signal.

In addition to these general advantages, the following advantages result from the particular system to be described hereinafter:

Use of a binary pseudo-random phase modulation (0 to $\pi$) permits a correlation function having a triangular maximum to be obtained.

Use of a technique analagous to a monopulse system, using two correlation curves, one subject to a time delay relative to the other, provides excellent precision at the point of intersection of these two curves, which corresponds to the measured distance of the obstacle.

Relative precision of constant measurement is obtained because the bandwidth of the transmitted signal and the two delays necessary for obtaining the two correlation functions are controlled simultaneously in accordance with the distance of the echo.

The primary aim of the invention is to create a frequency-distance relation, in such a way that at each instant a measurement of frequency gives, by a simple mathematical operation, the value of the corresponding distance. This is illustrated by FIG. 1.

A shift register Rd is connected in a closed loop so as to provide a cyclically repeating pseudo-random sequence of maximum length. This register is driven by a clock Hc, the frequency of which can be controlled by an applied voltage.

The pseudo-random sequence is applied both to the transmitter/receiver and to a shift register Ra which is also driven by the clock Hc. The expression "transmitter/receiver" means the part of the apparatus where a radar signal is transmitted and then reflected by a target so that it is received by the apparatus with a time delay $\tau$ in relation to the transmitted signal. The effect of the "transmitter/receiver" is thus equivalent to a phase shift occurring beyond the dotted line in the drawing.

The delay which is produced by the register Ra on the sequence which passes through it is a function of the operating frequency of the clock Hc. Two outputs can be obtained from this register, one output having a time delay relative to the other of one or two stages, thus supplying one signal of time delay $T_1$ and another signal of time delay $(T_1 + \Delta T)$, the ratio $T_1:\Delta T$ remaining constant. These two delayed signals are applied respectively to correlators $C_1$ and $C_2$ which also receive the original which has been reflected by the target, and thus has been subject to the delay $\tau$ which is to be measured. The two correlation functions are applied to a subtraction circuit S and the resulting error voltage is employed to control the frequency of the clock Hc.

The correlation functions obtained at the output of the correlators $C_1$ and $C_2$ have the form shown in FIG. 2 and their difference is as shown in FIG. 3. It is seen that the control point of the system is located at the point P of FIG. 3, at the intersection with the axis of the abscissae, and that the delay measured is equal to $T_1 + \Delta T/2$.

The value of this delay can deduced reduced from the knowledge of the frequency $F_H$ of the clock Hc. This value is equal to $$\frac{2n+1}{2F_H}$$

where the delayed outputs of Ra have a relative time delay of one stage, and equal to $$\frac{n+1}{F_H}$$

when they have a relative time delay of two stages. In these formulae, $n$ represents the number of the stages of the register Ra giving the delay $T_1$.

When one wishes to measure a distance with apparatus using this principle, a high frequency carrier signal is used, which will be modulated on transmission by the original sequence and demodulated on receipt by this same sequence or a delayed version thereof. The target can cause direct reflection of the incident waves or possess an incorporated transponder, which gives the same response in the present case.

For mobile targets, the amplification and correlation operations can be effected in a way which exploits the Doppler shift produced by the target.

Knowing that, for the example mentioned above, the longest distances to be measured are less than 30 meters, blocking means prevents the proximity radar from responding to more distant echos. The ground echos corresponding to distances greater than 60 meters are not correlated and are therefore attenuated by 20 dB.

The permanent echos have two sources, namely direct coupling between the transmitter and the receiver, and reflection on the antenna of part of the applied power.

The receiver is therefore equipped with a blocking device which acts before, during and after the periods of transmission.

In FIG. 5 $t_1$ is the time necessary to initiate blocking the receiver, $t_2$ is the time required to reconnect the receiver to the aerial and $T_d$ is the period between successive transmitted signals which is chosen in accordance with the return time of the wave emitted.

FIG. 4 shows the assembly of the principal components of a proximity radar in accordance with the invention. Those components which are also shown in FIG. 1 have the same references.

The transmission part of the proximity radar includes a radar frequency generator 1 of output frequency of 2 GHz an isolator 2, a phase modulator 3 also performing the function of a chopper and a duplexer 4 linked to an antenna 5.

The receiver part of the proximity radar includes a gating circuit 6 for the received radar signal, and a gating circuit 7 for the "local" signal applied to a mixer 8 of symmetric type.

The generator 1 uses a transistor connected as an oscillator which provides a power of 100 mW at 2 GHz. A connection between the transmission path and the input of the gating circuit 7 of the "local oscillator" signal applied the the symmetric mixer, is effected by a directional coupler 9 of 13 dB.

The generator 1 is decoupled by an isolator 2 in order to avoid production of harmonics due to mis-matching.

The modulator 3 is a 0 to $\pi$ reflection phase shifter controlled by two P.I.N. diodes which are controlled directly by logic gates 10, 11.

The duplexer 4 comprises a ferrite circulator which ensures application of the transmitted signal to the antenna 5 and the return signal received after reflection on the target to the receiving part.

In the receiving signal path, a gating circuit 6 at least partially blocks the receiver for the duration of each transmission.

A quarter wave trap 12, protects the symmetric mixer 8 from the blocked signals. The selectivity of the quarter wave trap protects the receiver from interference signals of frequencies outside its operating band.

The symmetric mixer 8, comprising SHOTTKY diodes, carries out the mixing of the received signal with the "local oscillator" signal. The local oscillator signal is gated at 7, which strengthens the blocking of the receiver during transmission, and is applied to the symmetric mixer 8 via a quarter wave trap 13 which also prevents the transfer of the blocked signals to the symmetric mixer 8.

Preferably, the radar frequency signals are produced according to a microstrip technique on a ceramic substrate.

A shift register with ten stages R, connected in a closed loop, is controlled by pulses from a clock Hc at 7.1 MHz, in the waiting condition (in the absence of received signal).

This register R thus supplies a series of sequences of which the unit bit duration is approximately 140 microseconds.

A blocking signal generator 14, controlled by the same clock pulses as the register R, supplies a rectangular signal of duration and phase identical to those of the bits of the register R but of repetition frequency 3 times lower than that of the clock pulses. The blocking signal duration is therefore equal to the duration of 3 bits. This signal controls a gate 10 which allows the passage towards the modulator 3 of one bit in three of the sequences of modulation supplied by the register R.

This modulator 3 acts on the signal produced by the oscillator 1 which delivers a single frequency wave. At the output of modulator 3, this radar frequency signal is applied to the transmission-receiving antenna 5 via the duplexer 4 and a coaxial feeder cable of which the delay is $t_2$.

The control signal of the blocking circuit 6 is derived from the signal blocking the transmitted signal. This control signal is the complement of the blocking signals enlargened by the time period ($t_1 + t_2$). That complementary control signal is produced by circuit 14' in FIG. 4. The receiver is therefore blocked during transmission. This action is strengthened by an identical blocking of the local oscillator signal.

The output of the mixer 8 is connected to a video frequency amplifier 15 of which the pass band is of the order of 50 MHz.

The amplifier 15 has a gain control of range greater than 30 dB, to which is applied a C.A.G. voltage from a circuit 16. The two outputs $S_1$ and $S_2$ of the video amplifier 15 are connected respectively to two signal paths which terminate at the two correlators $C_1$ and $C_2$.

These correlators $C_1$ and $C_2$ are each composed of a multiplier $C_{1a}$, $C_{2a}$ followed by a Doppler filter $C_{1b}$, $C_{2b}$.

The multipliers of each of the paths I and II multiply the received signal by the signals coming from the register R. They correspond respectively to the outputs of the shift register R$a$ (FIG. 1), delayed by one and by two bits respectively in relation to the output controlling modulation of the transmitted signal.

The identical "Doppler" filters $C_{1b}$, $C_{2b}$ in the two paths select the useful information from the multipliers $C_{1a}$, $C_{2a}$. The Doppler frequency is obtained at the output of these filters, and the levels thereof are detected at 20 and 21 and compared at S.

The C.A.G. voltage obtained from path II diminishes the amplitude range of the signal received by varying the gain of the video amplifier 15. When the detected voltage on path II reaches a value corresponding to a signal lever $5 \times 10^{-12}$W at antenna, the C.A.G. stabilises the output voltage of the correlator C2. The correlation curves are modified, but the distance indicated by their point of intersection is not affected.

The output of the comparator S is connected to an integrator 17 which supplies a voltage always greater than or equal to a reference voltage which serves as a "stop" (provided by 17$a$).

An "offset" of the comparator clamps the output of the integrator 17 to this stop, when the proximity radar is awaiting a useful received signal.

The output voltage of the comparator is applied to a voltage controlled oscillator $H_C$, the output of which, after being shaped at 18 serves as the clock signal for the shift register R and to the blocking signal generator 14.

A converter 19 transforms the frequency of the clock signal into a signal directly usable by the telemetry transmitters situated on board the vehicle carrying the proximity radar. In fact, the final distance-indicating means is a frequency meter.

In the absence of received signals corresponding to distances lower than 30 meters, the integrator is clamped and the clock frequency is fixed at 7.1 MHz. In this case, the correlation curves intersect at a point which corresponds to a radar distance slightly greater than 30 meters.

When the received signal corresponds to radar distances less than 30 meters, the integrator moves off its stop and supplies a voltage which increases the clock frequency of the register. The point of intersection of the two correlation curves is then dependent on the distance of the interception vehicle. The highest clock frequency corresponds to the distance of closest passage of these mobiles.

Transmission of information on the highest clock frequency to the ground enables the distance of closest passage to be ascertained.

It will be noted that the operating zone of the system covers all the distances from 0 to 30 meters, a feature which is particularly advantageous. In effect, it can be seen that in dependence on the angle $\theta$ at which the interception vehicle is oriented, its equivalent surface varies over a very large range and reaches its maximum at the distance of closest passage. For angles $\theta$ close to ½$\pi$, although a vehicle may not be detected at distances of 30 meters; it will be detected subsequently at the distance of closest passage, and the system will be actuated.

The action of the C.A.G. on the amplifier 15, which is common to the two paths, does not alter the relation between the voltages of the two correlation curves. It is sufficient, for operation to be correct, if the time constant of the C.A.G. is sufficiently short for it to respond to rapid fluctuations in level. The minimum response time is limited by the time constant of the Doppler filters which is in the order of 20 micro-seconds.

In the case of the proximity radar, a response time of 1 millisecond is sufficient.

The transmitted signal is of the pseudo-random type, obtained by phase modulation of a pure wave from 0 to $\pi$.

The modulation signal comes from a register connected in a closed loop, which delivers a series of identical sequences of which the number of zero states is equal to the number of 1 states, to within one unit.

The autocorrelation function of such a signal comprises a series of triangles superimposed on a pedestal, half the width of the base of each triangle being equal to the length of a bit of the correlation signal.

So that the base has a half-width of 20 meters in radar distance, which corresponds to a measured distance of 30 meters, it is necessary that the duration of a bit is $$\frac{20}{15\ 10^{-7}} = 133.10^{-7} \text{ seconds}$$

A clock is therefore necessary operating at a frequency of 7.5 MHz. In this case, the proximity radar is awaiting a useful received signal.

It should be noted that, in FIG. 4, functions of the registers R$a$ and R$d$ are performed by a single register R.

It should be understood that the embodiment described above is only an example, and it could be modified within the scope of the invention notably by substituting equivalent techniques.

We claim:

1. A radar installation for measuring distances of the order of several tens of meters by transmitting and receiving signals modulated by sequences of pseudo-random bits, including a transmitter for transmitting said signals, a receiver for receiving the transmitted signals after their reflection on a target, variable frequency clock common to said receiver and said transmitter, means for indicating the radar-target distance, comprising means for measuring the frequency of the clock, a first shift register connected in a closed loop and arranged in the transmission path of the radar installation to modulate the transmitted radar signals, a second shift register having two outputs connected from different stages thereof in order to provide two control signals, one signal having a time delay relative to the other signal, a pair of correlators, means for applying the signals received by said receiver of the radar installation to the inputs of the correlators, connection means for driving the two registers by said variable frequency clock and for controlling each of the correlators by the delayed signals from respective outputs of the second register and subtraction means for subtracting the output signals of one correlator from the output signals of the other correlator to produce a difference signal for controlling the frequency of the clock, which varies in dependence on the distance of the target from the radar installation.

2. A radar installation according to claim 1, including switching and blocking means so arranged that the radar signal is transmitted periodically for a part of a period and received, after reflection on the target, during another part of said period, said transmitter being provided with means responsive to the variable frequency clock for controlling the periodic transmission of the radar signal, means for permitting receipt of the signal reflected by the target, and for blocking receipt of the signal for a period greater than the transmission period thereof.

3. A radar installation according to claim 1, in which the subtraction means comprises a subtractor comparator, the connection means for connecting the outputs of said two correlators to the subtractor comparator includes detector devices, the connection means for connecting the output of the subtractor comparator to the clock includes an integrator and the clock comprises a voltage controlled oscillator.

4. A radar installation according to claim 3, in which said integrator is connected to means supplying a fixed reference voltage chosen to correspond to a small predetermined radar-target distance and said signal indicating means being operative if the radar-target distance, detected by the radar installation, becomes lower than the predetermined value.

5. A radar installation according to claim 1, in which the shift register used for modulation of the transmitted radar signals and the register of which two outputs control the respective correlators comprise a single shift register.

* * * * *